United States Patent
Annan et al.

(10) Patent No.: US 6,501,413 B2
(45) Date of Patent: *Dec. 31, 2002

(54) TIMING AND CONTROL AND DATA ACQUISITION FOR A MULTI TRANSDUCER GROUND PENETRATING RADAR SYSTEM

(75) Inventors: Alexander Peter Annan, Mississauga; Charles David Leggatt, Toronto, both of (CA)

(73) Assignee: Sensors & Software Inc., Mississauga (CA)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/273,461

(22) Filed: Mar. 22, 1999

(65) Prior Publication Data

US 2002/0080057 A1 Jun. 27, 2002

(51) Int. Cl.[7] .................................................. G01V 3/12
(52) U.S. Cl. ........................................ 342/22; 342/190
(58) Field of Search ......................... 342/22, 190, 191, 342/175, 198, 203

(56) References Cited

U.S. PATENT DOCUMENTS

| | | | | |
|---|---|---|---|---|
| 4,438,404 A | * | 3/1984 | Philipp | 328/63 |
| 4,654,584 A | * | 3/1987 | Gyles | 324/76 R |
| 4,755,951 A | * | 7/1988 | Hollister | 364/487 |
| 4,760,525 A | * | 7/1988 | Webb | 712/2 |
| 5,378,939 A | * | 1/1995 | Marsland et al. | 307/352 |
| 5,420,589 A | * | 5/1995 | Wells et al. | 342/22 |
| 5,506,583 A | * | 4/1996 | McVicker | 342/25 |
| 5,723,791 A | * | 3/1998 | Koch et al. | 73/597 |
| 5,764,551 A | * | 6/1998 | McCorkle | 364/724.011 |
| 5,898,308 A | * | 4/1999 | Champion | 324/643 |
| 5,991,036 A | * | 11/1999 | Frankel | 356/364 |
| 6,002,723 A | * | 12/1999 | Chethik | 375/317 |

FOREIGN PATENT DOCUMENTS

GB 2306651 A * 5/1997 ........... G01B/17/02

* cited by examiner

Primary Examiner—John B. Sotomayor
(74) Attorney, Agent, or Firm—Eugene J. A. Gierczak

(57) ABSTRACT

A multi-channel digital equivalent time sampling (MDETS) device having a programmable logic control that can select, delay or create various triggered signals. The MDETS can function independently or with multiple devices allowing for synchronized acquisition of data. The close proximity of MDETS device to a transmitter and receiver allows for the short time delay for acquiring the data.

24 Claims, 18 Drawing Sheets

T - transmitter location
R - receiver location $D = mP + nQ$
where $N \cdot Q = P$ Simple System

| Area | Application |
|---|---|
| Agriculture | Drainage pipe location |
| Agriculture | Roots |
| Agriculture | Soil compaction |
| Agriculture | Water content |
| Airports | Base course thickness |
| Airports | Cavities in walls |
| Airports | Cavities under floors |
| Airports | Compaction of base course |
| Airports | Concrete base/rebar |
| Airports | Conduits/utilities |
| Airports | Cracks within road, runway |
| Airports | Drainage/culverts |
| Airports | Embassy spooks |
| Airports | Hidden materials |
| Airports | Ice on runways |
| Airports | Ice strips/landing |
| Airports | Moisture content of base course |
| Airports | Pavement quality |
| Airports | Pavement thickness delamination |
| Airports | People detection |
| Airports | Pipes, cables, tanks |
| Airports | Structural elements |
| Airports | Stud finder |
| Airports | Thickness QA/QC |
| Airports | Voids under road, runway |
| Airports | Wall imaging |
| Airports | Wall thickness |
| Archeology | Artifacts |
| Archeology | Foundations/Area Construction |
| Archeology | Graves |
| Archeology | Monument imaging |
| Archeology | River/Lake bottom |
| Archeology | Sub-bottom profiling |
| Archeology | Wall/Floor mapping |

Figure 13a

| | |
|---|---|
| Biocounting | Caribou |
| Biocounting | Fish detection |
| Biocounting | Fish farming |
| Biocounting | Migration |
| Biocounting | Wildlife preserves |
| Bridges | Debonding/delamination |
| Bridges | Pavement thickness |
| Bridges | Pier quality |
| Bridges | Pier source/erosion |
| Bridges | Rebar corrosion |
| Bridges | Rebar location |
| Bridges | Route location |
| Bridges | Tension member |
| Bridges | Voids in concrete |
| Bridges | Wood rot |
| Building Inspection | Cavities in walls |
| Building Inspection | Cavities under floors |
| Building Inspection | Conduits/utilities |
| Building Inspection | Facing stone integrity |
| Building Inspection | Foundations & footings |
| Building Inspection | Structural elements |
| Building Inspection | Stud finder |
| Building Inspection | Wall imaging |
| Building Inspection | Wall thickness |
| Concrete | Conduit location |
| Concrete | Cracks/fractures |
| Concrete | Plastic rebar |
| Concrete | Quality/curing |
| Concrete | Rebar corrosion |
| Concrete | Rebar distribution |
| Concrete | Tension member mapping |
| Concrete | Thickness |
| Concrete | Voids within/beneath |
| Conveyer Belts | Counting |
| Conveyer Belts | Embedded obstacles |
| Conveyer Belts | Obstacle detection |
| Dams | Concrete quality/curing |
| Dams | Conduit location |
| Dams | Cracks/fractures |
| Dams | Grout monitoring |

Figure 13b

| | |
|---|---|
| Dams | Leak detection |
| Dams | Rebar corrosion |
| Dams | Rebar distribution |
| Dams | Tension member mapping |
| Dams | Voids within/beneath concrete |
| Dams | Wall thickness |
| Environmental | Buried tanks/barrels |
| Environmental | Contaminant presence/flow |
| Environmental | Geology & strata mapping |
| Environmental | Leaking tanks/pipes |
| Environmental | Monitoring change w/ time |
| Environmental | Trench/excavation/disturbed soil |
| Forensics/Police | Bathymetry/under water mapping |
| Forensics/Police | Building inspection |
| Forensics/Police | Buried Bodies |
| Forensics/Police | Buried objects |
| Forensics/Police | Cavities in walls |
| Forensics/Police | Cavities under floors |
| Forensics/Police | Concrete structures |
| Forensics/Police | Disturbed soil |
| Forensics/Police | Wall imaging |
| Forensics/Police | Wall thickness |
| Geotechnical | Depth to rock |
| Geotechnical | Faults |
| Geotechnical | Groundwater conditions |
| Geotechnical | Slurry wall |
| Geotechnical | Soil stratigraphy |
| Geotechnical | Voids/karst |
| Gravel Pits | Cover thickness |
| Gravel Pits | Quality sand/gravel |
| Gravel Pits | Reserves |
| Gravel Pits | Water table |
| Graveyard | Disturbed soil |
| Graveyard | Graveyard planning |
| Graveyard | Locating unmarked graves |
| Graveyard | Water table |
| Groundwater | Contamination |
| Groundwater | Flow direction |
| Groundwater | Fracture mapping |
| Groundwater | Fresh water intrusion |

Figure 13c

| | |
|---|---|
| Groundwater | Remediation monitoring |
| Groundwater | Salt water intrusion |
| Groundwater | Stratigraphy |
| Hydro/Nuclear Power | Buried tanks/barrels |
| Hydro/Nuclear Power | Concrete quality/curing |
| Hydro/Nuclear Power | Conduit location |
| Hydro/Nuclear Power | Contanimant presence/flow |
| Hydro/Nuclear Power | Cracks/fractures in walls |
| Hydro/Nuclear Power | Frazil ice |
| Hydro/Nuclear Power | Leaking tanks/barrels |
| Hydro/Nuclear Power | Rebar corrosion |
| Hydro/Nuclear Power | Rebar distribution |
| Hydro/Nuclear Power | Tension member mapping |
| Hydro/Nuclear Power | Voids within/beneath concrete |
| Ice/Snow | Avalanche prediction/monitoring |
| Ice/Snow | Avalanche victim location |
| Ice/Snow | Frazil ice |
| Ice/Snow | Glacier/sheet mapping |
| Ice/Snow | Ice thickness rivers/lakes/sea |
| Ice/Snow | Snow thickness - ski resorts |
| Ice/Snow | Snow thickness - water content |
| Ice/Snow | Through-ice bathymetry |
| Lake/River | Peat bog thickness |
| Lake/River | Pipe/cable mapping |
| Lake/River | Sub-bottom profiling |
| Lake/River | Water depth |
| Lake/River | Weed mapping |
| Military | Integrated systems |
| Military | Landmine detection |
| Military | Motion sensor |
| Military | Non/low metallic |
| Military | Site assessment |
| Military | Stand-alone backpack |
| Military | Tunnel detection |
| Military | UXO detection |
| Mining | Crown pillar |
| Mining | Crystal location |
| Mining | Hazard/soft rock/water/fracture |
| Mining | Locating surface drillholes |
| Mining | Mining machine guidance |

Figure 13d

| | |
|---|---|
| Mining | Nuclear waste disposal |
| Mining | Ore delineation |
| Mining | Placer exploration |
| Mining | Stope detection |
| Mining | Vein/high grade locate |
| Pipe/Sewer Inspection | Leaks |
| Pipe/Sewer Inspection | Liner |
| Pipe/Sewer Inspection | Pipe Integrity |
| Pipe/Sewer Inspection | Trenching around |
| Pipe/Sewer Inspection | Voids/outside |
| Quarries | Rock integrity (prior) |
| Quarries | Rock quality (post) |
| Quarries | Stope detection |
| Quarries | Structure |
| Railroads | Ballast condition/compaction |
| Railroads | Ballast quality |
| Railroads | Base material/quality |
| Railroads | Bridge structure integrity |
| Railroads | Depth to bedrock |
| Railroads | Hazards ahead/around (pre) |
| Railroads | Karst |
| Railroads | Pipe/cable/culvert |
| Railroads | Route selection (pre) |
| Railroads | Tie inspection |
| Railroads | Void depth/location |
| Railroads | Voids behind liner (post) |
| Real Estate | Buried tanks/barrels |
| Real Estate | Cavities in walls |
| Real Estate | Cavities under floors |
| Real Estate | Conduits/utilities locate |
| Real Estate | Contaminant presence/flow |
| Real Estate | Facing stone integrity |
| Real Estate | Leaking tanks/barrels |
| Real Estate | Structural elements |
| Real Estate | Stud finder |
| Real Estate | Terminte inspection |
| Real Estate | Trench/excavation/disturbed soil |
| Real Estate | Wall thickness |
| Roads | Base course thickness |
| Roads | Compaction of base course |

Figure 13e

| | |
|---|---|
| Roads | Concrete base/rebar |
| Roads | Cracks within |
| Roads | Drainage/culverts |
| Roads | Karst |
| Roads | Moisture content of base course |
| Roads | Pavement quality |
| Roads | Pavement thickness/delamination |
| Roads | Rebar/tension members within |
| Roads | Route selection |
| Roads | Thickness QA/QC |
| Roads | Void depth/location |
| Security/Customs/Immigration | Embassy spooks |
| Security/Customs/Immigration | Hidden materials |
| Security/Customs/Immigration | People detection |
| Security/Customs/Immigration | Tunnel detection |
| Smelters | Liner thickness |
| Treasure Mapping | Buried artifacts |
| Treasure Mapping | Cavities in walls & floors |
| Treasure Mapping | Disturbed soil |
| Treasure Mapping | Foundation/area construction |
| Treasure Mapping | Graves |
| Treasure Mapping | Sub-bottom profiling |
| Trenchless Technology | Bedrock location |
| Trenchless Technology | Guidance |
| Trenchless Technology | Karst |
| Trenchless Technology | Obstacle/old foundations |
| Trenchless Technology | QA/QC |
| Trenchless Technology | Route selection |
| Trenchless Technology | Utility location |
| Trenchless Technology | Void depth/location |
| Tunneling | Depth to bedrock |
| Tunneling | Hazard ahead/around (pre) |
| Tunneling | Karst |
| Tunneling | Route selection (pre) |
| Tunneling | Void depth/location |
| Tunneling | Voids behind liner (post) |
| Utility/Pipes | Concrete P&C locates |
| Utility/Pipes | Electrical/telephone/cable |
| Utility/Pipes | Fiber optics |
| Utility/Pipes | Leak location |

Figure 13f

| Utility/Pipes | Metal P&C locates |
|---|---|
| Utility/Pipes | Plastic P&C locates |
| Utility/Pipes | Route selection |
| Wood Inspection | Beams |
| Wood Inspection | Bridges |
| Wood Inspection | Live tree rot/quality |
| Wood Inspection | Rail ties |
| Wood Inspection | Termite inspection |
| Wood Inspection | Water content |
| Wood Inspection | Wooden poles |

Figure 13g

TIMING AND CONTROL AND DATA ACQUISITION FOR A MULTI TRANSDUCER GROUND PENETRATING RADAR SYSTEM

FIELD OF THE INVENTION

This invention relates in general to ground penetrating radar systems, and more particularly to the concurrent use of multiple transducers for a ground penetrating radar system (GPR).

BACKGROUND OF THE INVENTION

There is a growing demand for GPR systems that have the ability to acquire data with more than one transducer. The ability to run more than one transducer at a time is extremely complex given the nature of the problem. Systematic control of accurate timing in a distributed multitransducer network of GPR systems requires unique timing and logic elements.

In current practice, systems most often have one transmitter and one receiver transducer. Generally GPR systems obtain data along a measurement traverse line with the transmitter and receiver in a fixed geometrical configuration with respect to one another (prior art, FIG. 1); the GPR system as a whole is moved over the ground or medium to be explored (Annan, A. P., Davis, J. L., *Ground Penetrating Radar— Coming of Age at Last*, 1997; Proceedings of the Fourth Decennial International Conference on Mineral Exploration (Exploration'97), Toronto Canada, Sep. 14 to Sep. 18, 1997).

References to the utilization of more than one transmitter or receiver are limited. Prior attempts have been made as described in U.S. Pat. No. 5,248,975 issued to Schutz, A. E., entitled "Ground Probing Radar with Multiple Antenna Capability".

There are four major problems that have to be overcome.

The first problem is that the acquisition of ground penetrating radar traces in single transient waveform capture process, in digital form (or even analog form) is virtually impossible. Current commercially available analog to digital (A/D) converters are simply not fast enough nor do they have sufficient dynamic range to record the signals required for many of the GPR applications.

As a result, GPR systems resort to some sort of repetitive signal in order to capture the desired data. The most common approach is to use equivalent time sampling. Other approaches are to use a step frequency continuous sinusoidal wave technique that acquires data in the frequency domain by detecting the in-phase and quadrature response of the transfer function at a number of frequencies; the time domain signal is created by fourier transform.

A third approach is to use a fast A/D converter with few bits (i.e. limited dynamic range) and then stack the resultant signal for many repetitions in order that the resolution can be brought up. A fourth approach is to transmit some stream of random signals and use a correlation technique to extract the impulse response.

With all these approaches, considerable time is needed at each observation point to acquire data of a satisfactory nature. Combining such complex, individual signal capture processes with multiple spatially distributed transducers and simultaneously maintaining timing synchronization to very tight tolerances is a complicated task. The complexity arises is part arises in part because the transit time to transfer control signals between spatially separated transducers is both finite and are comparable or bigger than the measurement time lags.

The second major problem in trying to operate more than 1 unit is that multiple 2 transmitting sources operating at the same time can interfere with one another. If one wishes to operate two units, which are collecting independent information but operating at the same time then it is important that the signals from the transmitters do not get emitted at exactly the same time so that the two data sets can be acquired with high fidelity. In other words, a multiplexing process is required. In some instances it is desirable to have the transmitters operating simultaneously, but in this case one wants to make sure that the timing of the transmitters is synchronized in order to enhance the measurement process.

The third problem is that the transducers (or antennas) which create, emit and capture the electromagnetic signals which are transmitted into the ground are highly dependent on their immediate surroundings. When multiple transducers are placed in close proximity to one another, the transducers can interact in an almost unpredictable fashion and generate spurious signals.

The final problem is with the spatial distribution of the transducers. Since the signals that are being measured are radio waves that travel at the speed of light, all of the times involved in the measurement process are very short. Since the subsurface spatial dimensions may be similar to the separation distances between GPR components, the travel times on the inter connecting cabling or internal signal paths of the systems can become as large or larger than the travel times of the signals through the media being probed. As a result, it is important that any timing system be able to recognize these time differences and provide a means to measure and/or adjust times to eliminate the time delays associated with spatial distribution of the transducers.

FIGS. 2–5, show the most commonly envisaged multi-unit systems. FIG. 2 shows the use of multi transducer systems where the objective is to obtain data records from a variety of separations between the transducers. Many applications could benefit if data from a multiplicity of separations could be acquired simultaneously. Fisher, E., McMechan, G. A., and Annan, A. P., *Acquisition and Processing of Wide-Aperture Ground Penetrating Radar Data;* 1992; Geophysics, Vol. 57, p. 495–504, and Greaves, R. J. and Toksoz, M. N, *Applications of Multi-Offset Ground Penetrating Radar; Proceedings of the Symposium on the Application of Geophysics to Engineering and Environmental Problems,* 1994; (SAGEEP'94), p. 775–793 discuss the use of variable offset measurements and the enhancement of the data that can be achieved by coherent spatial stacking in the spatial dimension.

The acquisition of multiple separation data measurements made at each station along the transect line, is called multi-fold offset surveying. Multi-offset data available at every measurement point allows for the extraction of a velocity cross-section, an attenuation cross-section and an enhancement of data by determining an optimum spatial stacking velocity structure.

The second type of multi-channel system is depicted in FIG. 3. In this case the objective is to cover a larger area more quickly. Many GPR applications require acquisition of data on a series of parallel lines in order that a large area can be covered to obtain a three dimensional volume view of the ground.

One way of improving such surveys is to have a number of measurement systems mounted side-by-side and have these transported over the ground simultaneously. In FIG. 3a, a one channel system is shown sequentially measuring up and down 4 lines to acquire the same data that 4 transducers traversing once simultaneously over the four lines would achieve as shown in FIG. 3b. It is useful to note in this application that the individual units can more or less operate independently. They do not require synchronous sampling times but it is desirable that the transmitter be set up to operate at different staggered times to eliminate any potential of interference between the units caused by simultaneous operation of the individual units.

FIG. 4 depicts still another type of application where multiple transducers or measurements are desirable. The bandwidth of GPR systems is limited by the intrinsic characteristics of antennas. For detailed study of the subsurface, a number of systems with different frequency bandwidths and corresponding different physical sizes may have to be traversed along the same line in order to achieve full coverage of the subsurface.

At present, this type of operation is achieved by surveying the line a number of times as depicted in FIG. 4, once with each transducer. The whole operation could be completed more quickly if all (three transducers in the example shown) transducers are moved simultaneously along the line at one time and the same data acquired. Coordination of spatial acquisition and signal acquisition timing on a moving platform is commonly required for speed and efficiency of data acquisition.

The most general use of multi-unit systems is depicted in FIG. 5 and consists of a full array of transmitters and receivers spread over an area. The operation of transmitters either independently or synchronously together in time, as well as all of the receivers operating and acquiring data synchronized in time, provides a powerful means of subsurface imaging. The whole package shown could be transported along the line to provide multi-offset continuous data in a three dimensional fashion. Such data acquisition then lends itself to use of synthetic aperture processing or the equivalent multifold three-dimensional 3D seismic processing concepts that are commonly applied in the petroleum industry.

Such an application requires precise synchronization of the timing of all of the transmitters and receivers that are spatially distributed. If the platform is moving in space then synchronization of platform position and data acquisition time is an added factor to be managed.

Equivalent time sampling (ETS) is a means of using multiple repetitions of a transient signal to capture a transient waveform (Mulvey, John, *Sampling Oscilloscope Circuits;* 1970; Internal Publication of Tektronix, Inc., Beaverten, Oreg. & Phillips). Other modes of operations such as continuous wave, step frequency or instantaneous capture and stacking can use the timing control concepts outlined here. We will use ETS to demonstrate concepts of the patent.

As indicated previously, ETS receivers require successive repetitions of the signal waveform to be recorded in order that it can be acquired. Fisher (supra) provides information on ETS and some of the types of systems that have evolved.

Analog ETS systems were spawned in the 1960's and 1970's. FIG. 6 depicts a typical ETS. A timing circuit is required which will provide a very controlled time delay between signal creation and the time at which a measure of the signal waveform (sampled over a short time interval) is acquired. Historically two analog ramps, one slow and one fast, were used to drive a comparator that would provide a time delayed trigger output.

For the ETS shown in FIG. 6, the key feature is that the receive trigger is delayed in time progressively on every repetition of the transmit pulse. This time delay is dictated by a control clock delay, increases the delay from a minimum value to a maximum value over a fixed amount of time (i.e., N repetitions of the control clock). When the number of desired repetitions of the control clock which span the time window to be swept has been reached, the whole system is reset and the sequence starts over again. To work properly the control clock has to be very stable and regular.

Using a sample and hold or a sampling head circuit, the transient signal is captured over a short interval in time and is output from the sampling device as a continuous analog voltage. Provided the control clock is stable and the delay time varies linearly, the analog voltage is a replica of the transient waveform input but which is slowed down in time. Time stretching of 1,000:1 or even 1,000,000:1 is common.

The captured signal in the case shown in FIG. 6 requires N repetitions of the master clock and the transmitted signal to acquire one replica of real signal. The real time transient waveform will be sampled over a real time interval $N\Delta t$ where $\Delta t$ is the amount the receiver trigger is delayed on each successive cycle of the system. What characterizes such a system is the repetition rate. This is the clock shown in the schematic diagram in FIG. 6. If the repetition period of the clock is P, then the real time signal interval $N\Delta t$ will be acquired in an elapsed time of NP. This is an equivalent time stretch factor that is determined by the ratio $$\frac{P}{\Delta t}.$$

When using analog oscilloscope displays or audio tape recorders for data acquisition, the analog signal is stretched to the audio frequency range from the radio frequency range. This enables data display recording and replay using lower-cost and lower speed electronics.

The basic analog ETS system as depicted can be used to support multiple transmitters or receivers. If the triggering signals can be sequenced by a computer, or some sort of preprogrammed logic array, then a number of channels of data can be acquired as shown in FIG. 7.

In this situation the receiver and transmitter triggers as shown in FIG. 6 are fed through a switching network which enables transmitter or receiver units to be switched or enabled or disabled. The output of the receivers are analog traces which can then be digitized or displayed on an oscilloscope or recorded on an analog tape (Mulvey, John, supra).

There are drawbacks in this approach. If there are M transmitter and receiver pairs to be switched, then the acquisition time increases to M×NP. In other words, data acquisition rate is slowed down. If a single transmitter and a multiple set of receivers are to be used to acquire time synchronous data, then the full waveform recording sequence for the receivers must be required before switching to another transmitter and repeating the sequence. Such multiplexing reduces the rate at which the system can be moved spatially.

There is no simple way in which the timing associated with delays along the interconnect lines can be handled in any systematic fashion. This may be developed into the system by calibrated cables or may be handled in post acquisition but it is not readily accommodated by the analog ETS configuration shown.

Therefore a multi transducer ground penetrating radar system in a compact self-contained modular form is needed.

SUMMARY OF THE INVENTION

This invention is a modular control system to enable time and space synchronized GPR data acquisition from multiple transducers. One aspect of the present invention is to provide an improved multi transducer capability for a ground penetrating radar system where a virtually unlimited number of transducers can be accommodated without the drawback of increased data acquisition time.

Another aspect of the present invention, allows for a completely operational, self-calibrating multi transducer system. The present invention contains modular compact circuits for internal timing of signal emission, detection, digitalization and recording of data. In addition, with suitable control logic, measurement of and compensation for inter transducer communications delays can be automated.

Conveniently, the present invention allows for independent operation of individual transducers but simultaneously permits acquired data to be used in a common process or by several independent acquisition and display systems.

Another aspect of the present invention is the ability to use a master timing computer to coordinate groups of the multi transducer subsystems to acquire data in an interleaved fashion but with each subsystem operating in a totally self contained manner controlled by its own computer or clock. This mode of operation is optimal when there is signal coupling between the subsystems but where the data from each subsystem can be treated as independent data streams.

Conveniently the time bases of the present invention can be synchronized such that all the devices can detect and record signals from all other devices. Operation in this manner is beneficial for enhancement and extraction of information contained in the spatial placement of the transducers. The ability to process all signals coherently allows for the implementation of real time or post acquisition synthetic aperture and multifold signal processing such as used in the petroleum seismic.

DETAILED DESCRIPTION OF THE DRAWINGS

A detailed description of the preferred embodiment is provided herein below by way of example only with reference to the following drawings, in which:

FIGS. 1a and 1b are schematic representations of the measurement and response of a ground penetrating radar system.

FIGS. 2a, b, c. are schematic representations of variations of multi offset measurements.

Figure 11:
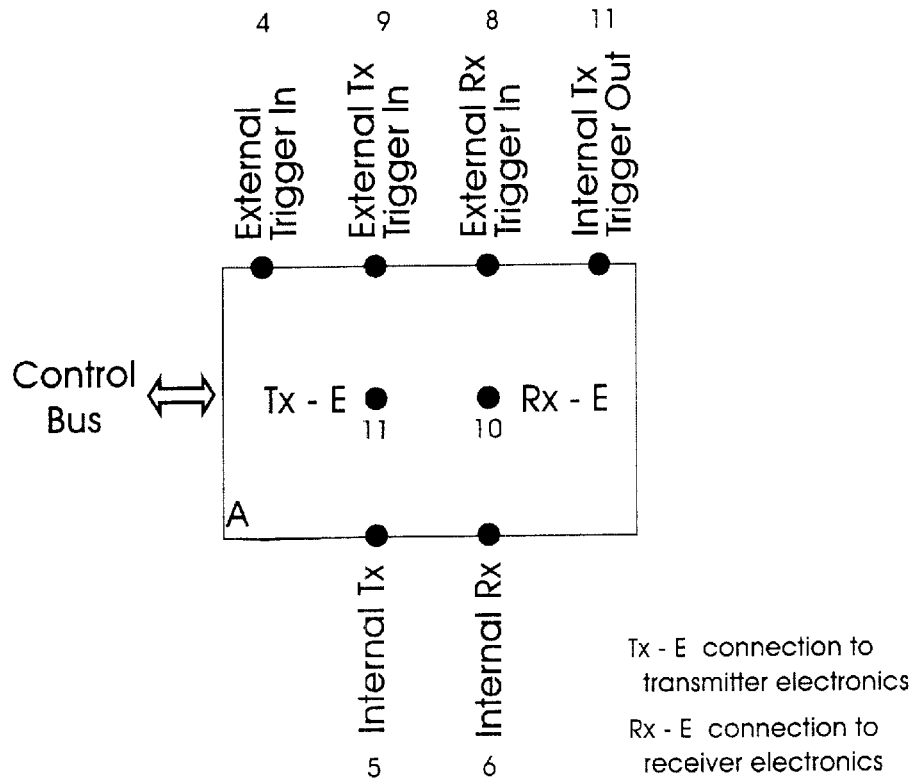
FIG. 11 is a modular schematic representation of the multi digital equivalent time control logic (MDET CL).
Figure 12A:
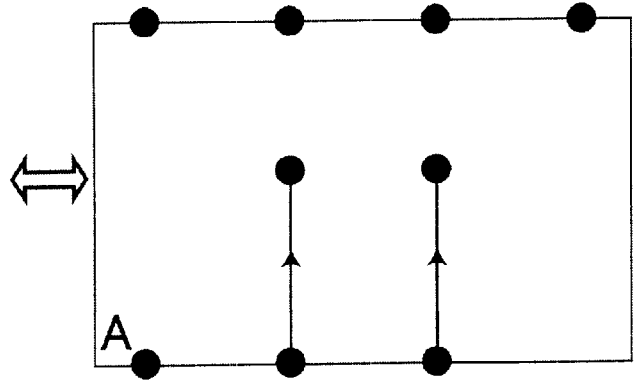

FIGS. 12a, b, c, d are schematic representations of various GPR system configuration based on the MDETS CL schematic representation in FIG. 11.

FIG. 13 is a table outlining the different applications of the invention.

In the drawings, preferred embodiments of the invention are illustrated by way of example. It is to be expressly understood that the description and drawings are only for the purpose of illustration and as an aid to understanding and are not intended as a definition of the limits of the invention.

DETAILED DESCRIPTION OF THE PREFERRED EMBODIMENT

In the description that follows, like parts are marked throughout the specification and the drawings with the same respective reference numerals. The drawings are not necessarily to scale and in some instances proportions may have been exaggerated in order to more clearly depict certain features of the invention.

Figure 8A:
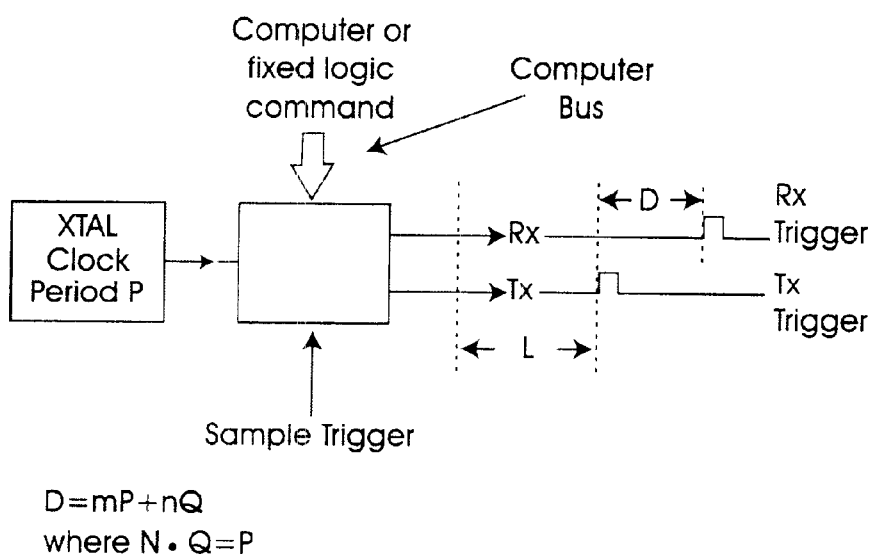
FIGS. 8a and 8b are schematic representations the timing control logic and data sampling element of a digital equivalent time sampling (DETS) system.

Digital equivalent time sampling (DETS) is a modern approach to ETS. The basic concept is depicted in FIG. 8. With DETS, a single sample of a transient waveform is acquired at a time delay D after stimulation of the response. In DETS, the time delay D is discretized and programmable. In initial DETS systems, the time delay was defined as nQ where n is an integer and Q is a fixed time interval. The result is $$D=nQ \quad 0<n<N \tag{1}$$

In general the value of N was some finite limit dictated by the digital logic of the embodiment by a microprocessor. Typically the maximum n values would $2^{10}$ and $2^{12}$ in early devices. This type of digital equivalent time sampling is common in commercial products.

In this invention a more sophisticated clocking sequence is used to generate delays. In this case differential time delays have the form $$D=mP+mQ \tag{2}$$

where N×Q=P which gives a coarse and fine delay capability to the timing. In addition a common time delay can be introduced.

$$L=kP \tag{3}$$

The reason for this extended approach is that for most GPR applications and particularly multi transducer configurations, the time delays which may be required are much larger than a simpler DETS system can accommodate. By approaching the construction this way one maintains the fine scale Q resolution but at the same time extends the offset range to a much larger range.

DETS provides a tremendous versatility in the equivalent time sampling concepts. The most important aspect is that there is no longer a need for a repetitive clock rate which dictates the systems output data rate. Each point sampled using a DETS system is an acquisition that is totally independent of any other point acquired.

For example the system could gather sample points once per second for a while, then once every 10 seconds or once every millisecond and the resulting waveform would be captured with equal validity as if all of the samples were acquired at a one microsecond interval. In other words, sampling is now an individual point event and no longer requires a clock or a fixed repetition rate for the transmitter or any other part of the circuit. In a DETS, there is usually a stable crystal clock which is used to provide the fundamental period P and the fine sampling interval Q but this clock has no relationship to the rate at which samples are acquired.

Figure 1A:
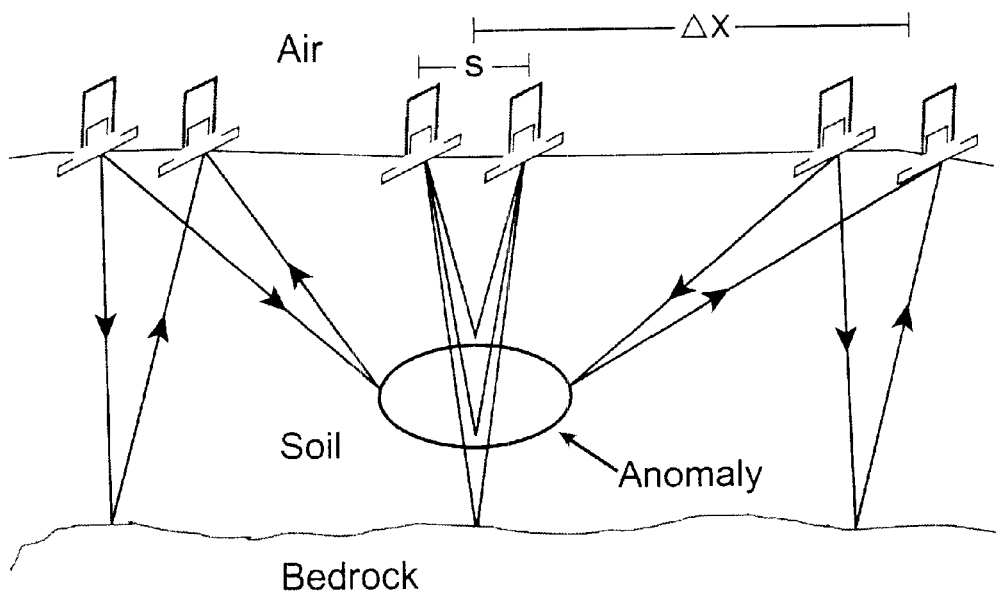
Figure 1B:
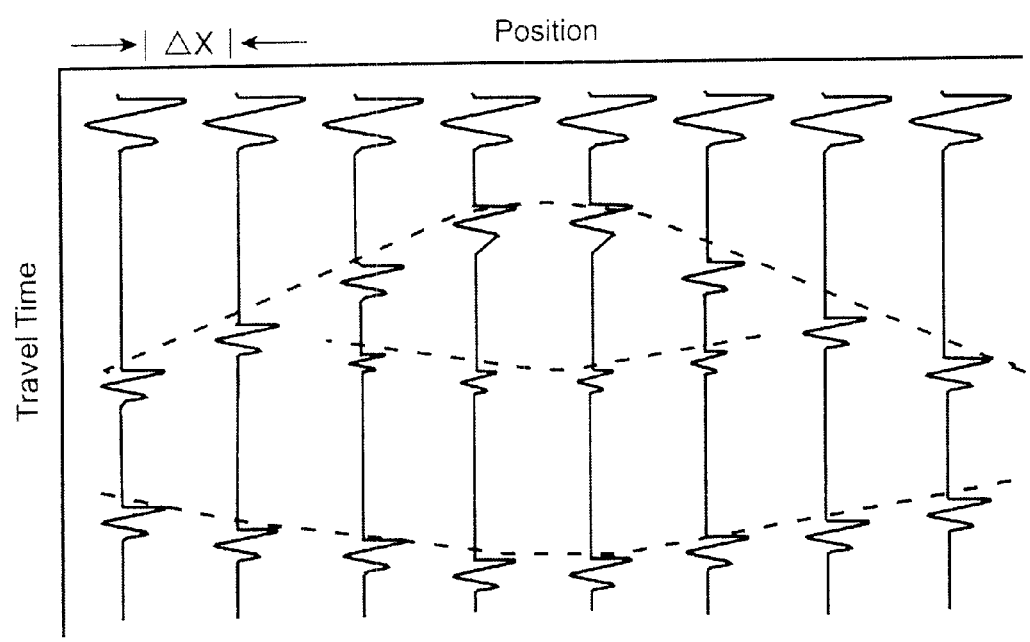
Figure 2A:
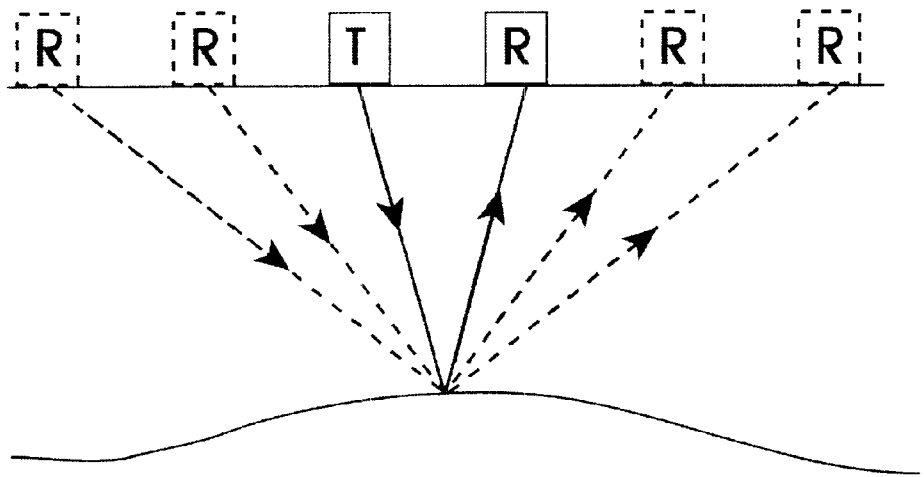
Figure 2B:
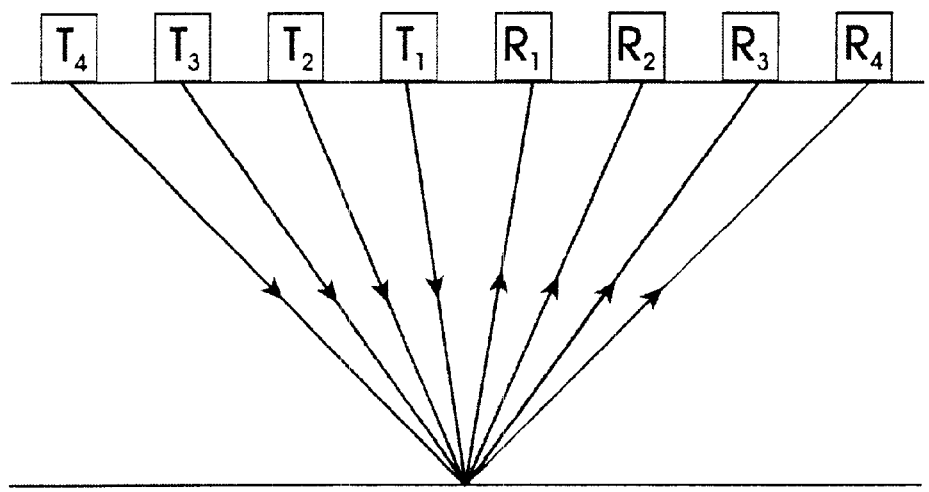
Figure 2C:
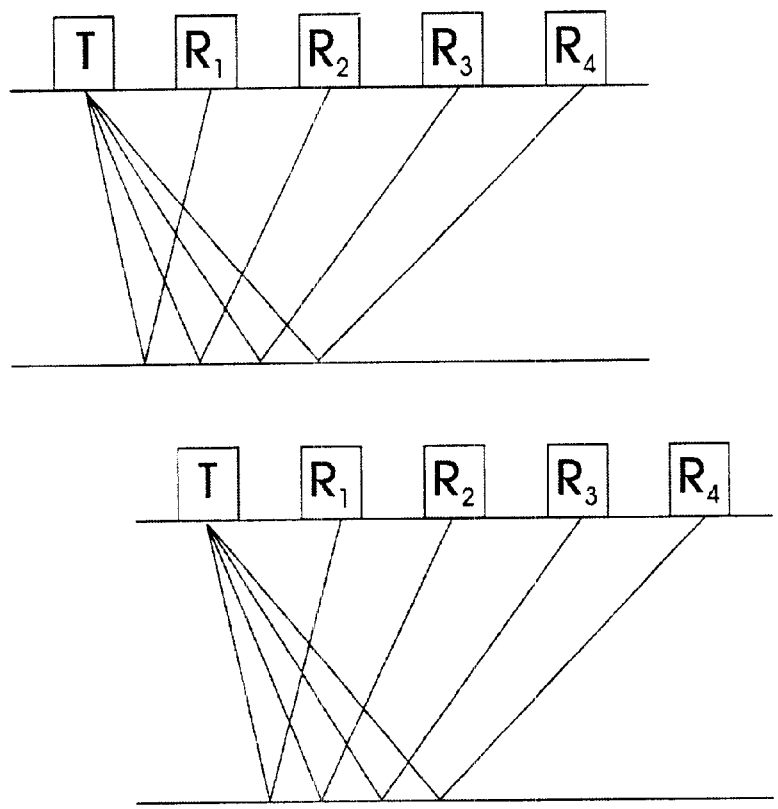
Figure 3A:
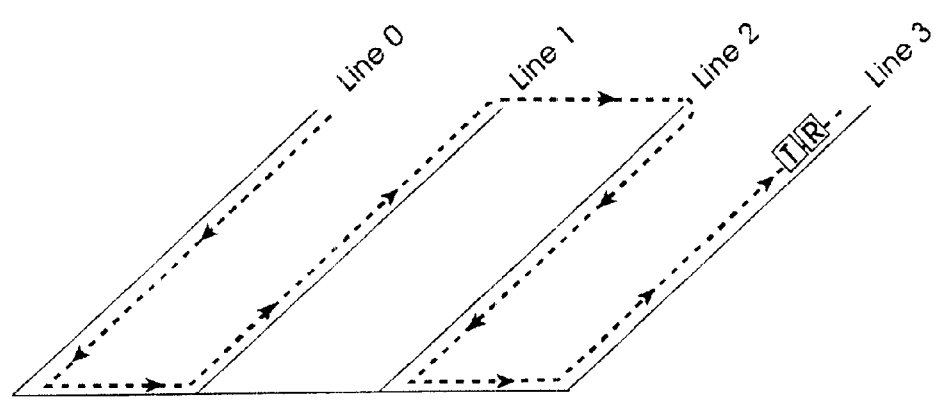
FIG. 3 shows are schematic representations of mapping an area with (a) a single unit or (b) with several units operating parallel.
Figure 3B:
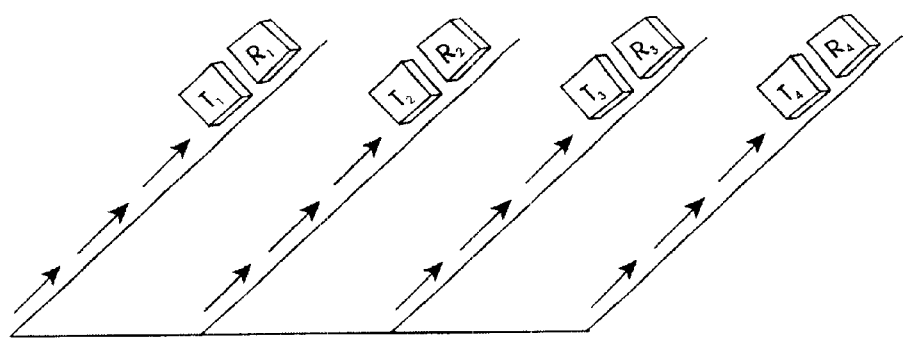
Figure 4A:
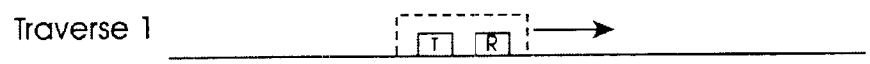
FIG. 4 shows schematic representations of the use of different frequency ground penetrating radar system along a transect. In 4a the measurement is made by a signal system several times while 4b shows multiple units making the same measurement simultaneously.
Figure 4A:
Figure 4A:
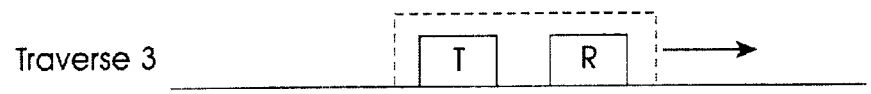
Figure 4B:
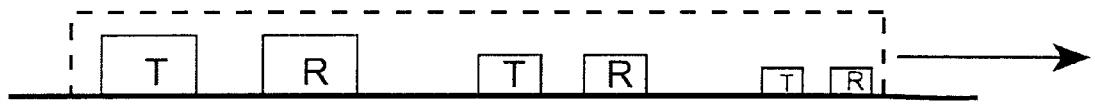
Figure 5:
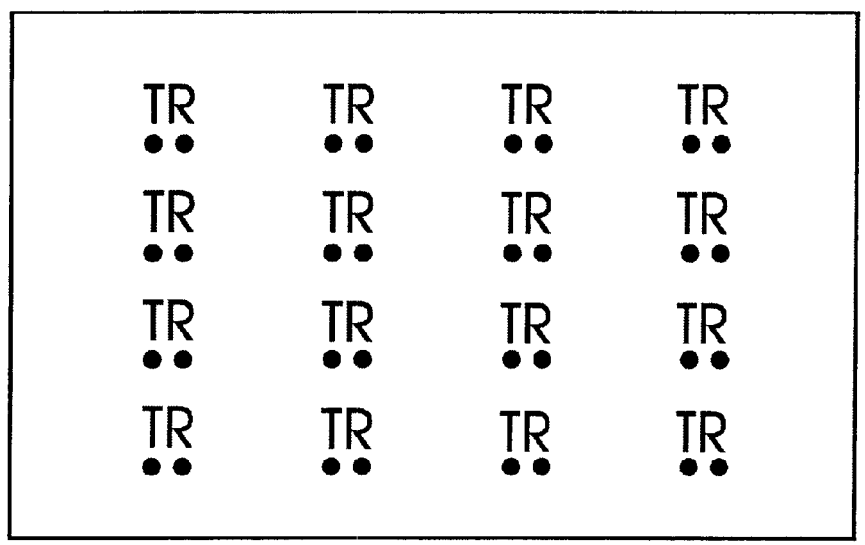
FIG. 5 is a diagram of the most general configuration of transmitters and receivers for a ground penetrating radar system where by an array of devices are spread out over an area or mounted on a platform that may be transported spatially.
Figure 6A:
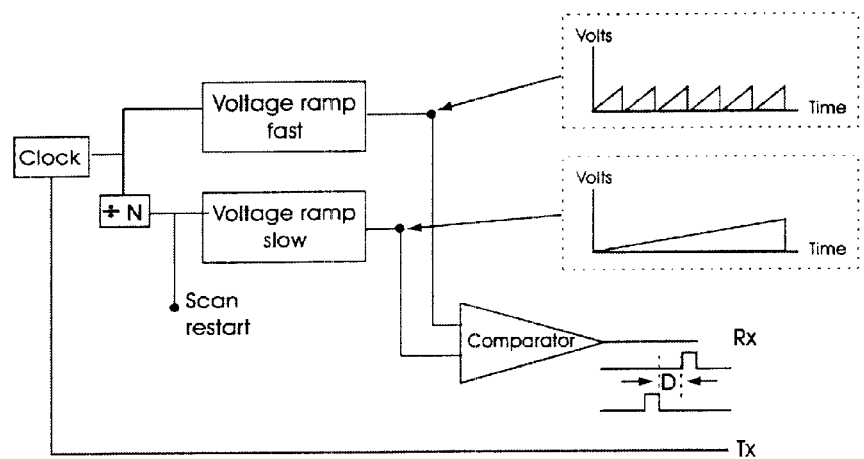
FIGS. 6a and 6b are schematic representations of a conventional analog equivalent time sampling system.
Figure 6B:
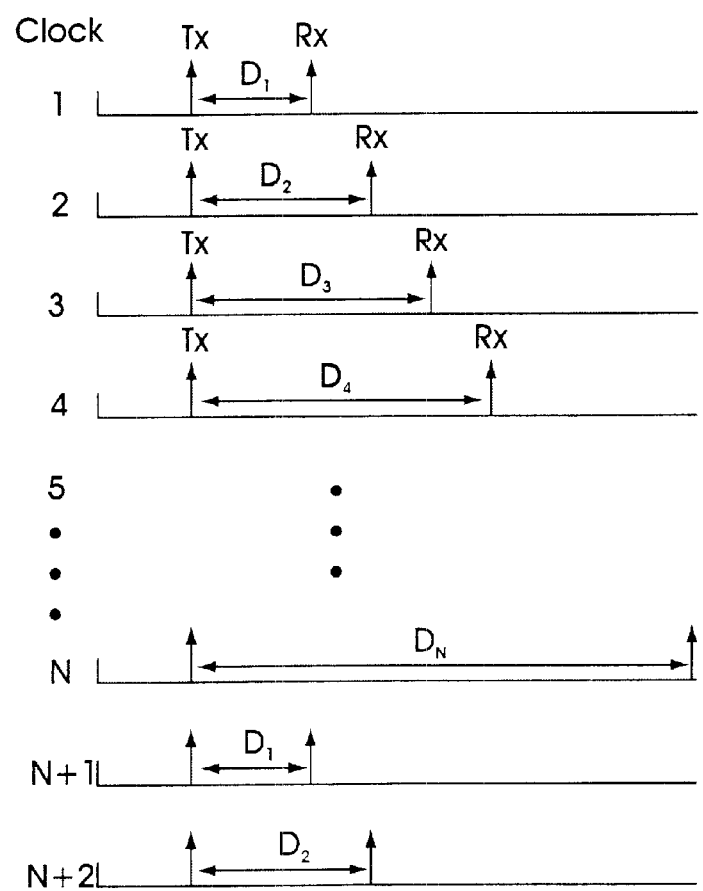
Figure 7:
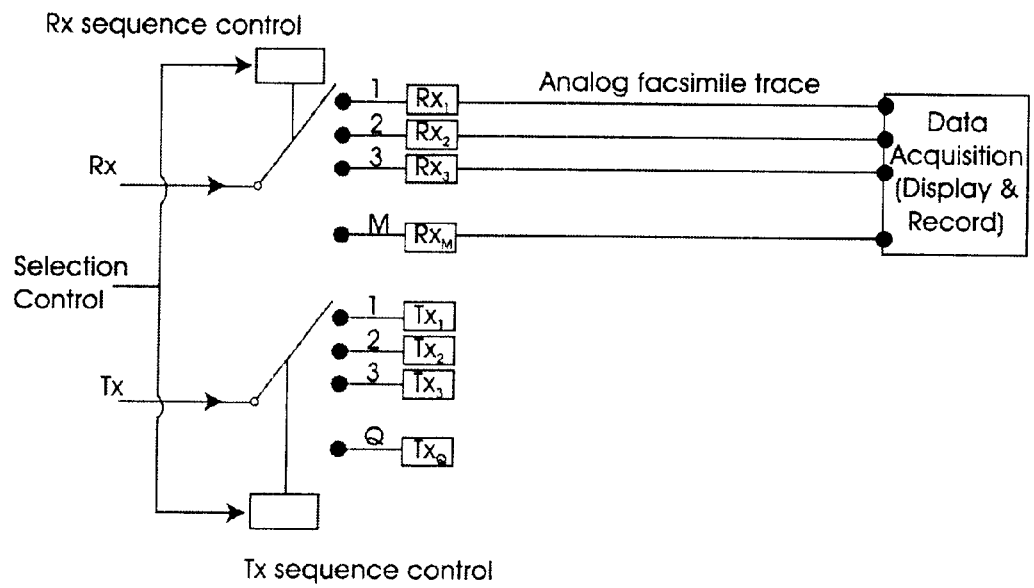
FIG. 7 is a schematic representation of an analog time-based equivalent time sampling system using multiple transducers and receivers.

With a DETS base system, the equivalent to the analog trace acquisition discussed in FIG. 6 can be emulated by having a computer or some programmable or hardwired logic develop a series of time delays $D_i$ $$D_1 = \Delta t$$
$$D_2 = 2\Delta t$$
$$D_3 = 3\Delta t \qquad (4)$$

where $\Delta t$ in this case equals pQ where p is an integer (i.e., $\Delta t$ must be an integer multiple of the fundamental programmable delay interval Q).

Figure 8B:
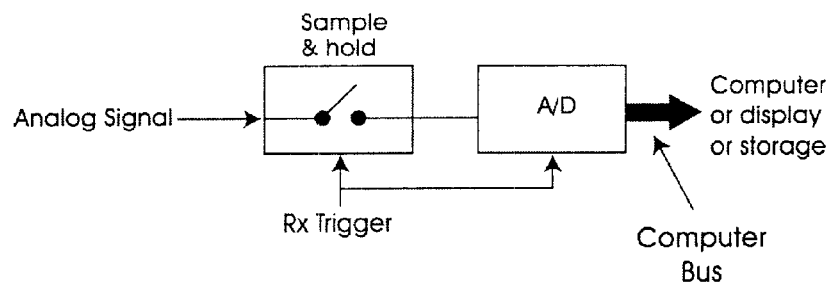

A second integral part of DETS is the digital capture of the signal. As depicted in FIG. 8b, the high, speed analog signal at time delay D is captured directly into digital form. The receive trigger is used to open and close a fast switch or sample and hold, which feeds into an A/D converter that outputs directly to a computer or other display device.

The key point is that the transient data value at the given delay time is captured and stored as a contained action with no reference to other points which may be captured before or subsequently in time.

A DETS system can repeat the observation at a fixed delay any number of times and a computer or hard-wired logic circuit can take the individual observed values from each repetition and average them to obtain an enhanced measurement with reduced noise.

The time delay, D, can be driven from a random number generator. In this case, the integer values m and n in FIG. 8 would be random and as a result the delay time would be randomized. If the observed data are recorded along with the delay time associated with m and n then a reconstruction of the waveform can be achieved by sorting the delay times in descending order and then plotting the observed signal versus delay time.

With a DETS system, the time sampling can be discontinuous as shown in FIG. 4. In this case, there are two time windows recorded, one from time $\Delta t$ to $3\Delta t$ and another one from $30\Delta t$ to $32\Delta t$. Only three points are indicated here, but this could be generalized to any number of points. Since the spacing between windows is programmable such an approach can be used to develop an event tracker to record data from a given delay time and ignore all others. For example $$D_1 = \Delta t$$
$$D_2 = 2\Delta t$$
$$D_3 = 3\Delta t$$
$$D_4 = 30\Delta t$$
$$D_5 = 31\Delta t$$
$$D_6 = 32\Delta t \qquad (5)$$

With DETS systems, one can acquire data in reverse order such as might be obtained by the following sequence of delay times.

$$D_1 = 6\Delta t$$
$$D_2 = 5\Delta t$$
$$D_3 = 4\Delta t$$
$$D_4 = 3\Delta t$$
$$D_6 = 1\Delta t \qquad (6)$$

If there is a need to vary the stacking with delay time, then the delay time can be fixed at a given value for a variable number of repetitions of the transmitter and signal averaged a variable number of times depending on time delay. A simple illustration of this is the following table.

| Stat | End | Delay | | (7) |
|---|---|---|---|---|
| 1 | 5 | $\Delta t$ | $v(\Delta t) = \sum_{1}^{5} V_i/5$ | |
| 6 | 10 | $2\Delta t$ | $v(2\Delta t) = \sum_{5}^{10} V_i/5$ | |
| 10 | 20 | $3\Delta t$ | $v(3\Delta t) = \sum_{10}^{20} V_i/10$ | |

Since the samples of a DETS system can be acquired at irregular time intervals, the transmitter emissions can spread spectrum in character rather than spectral line in character as a regular repetition of signal would entail. Since data samples can be acquired on demand, synchronization of data sampling with spatial position on a moving platform becomes a manageable activity.

Figure 9:
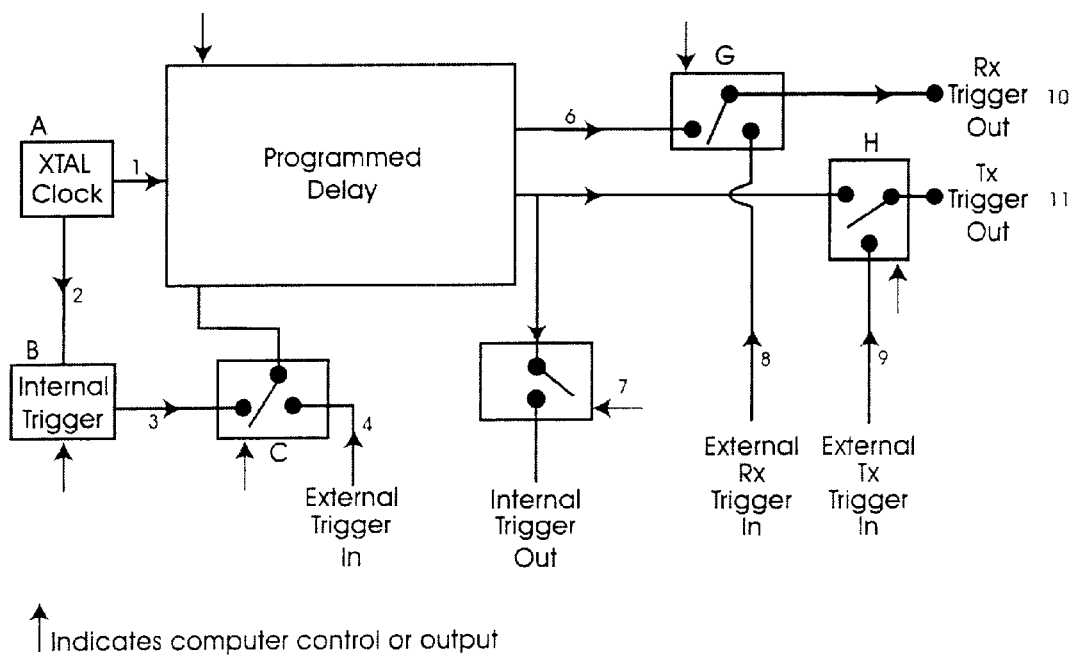
FIG. 9 is a block diagram logic representation of a multi channel digital equivalent time sampling (MDETS) control.

By suitable design of the DETS system, the triggering paths and the delays can be computer controlled and assembly of multi-channel systems becomes practical. Such a DETS designed system provides a powerful multi channel capability. FIG. 9 shows the control logic (CL) basic building block of what is called a multi-channel DETS system (MDETS).

FIG. 9 shows the CL block of a MDETS system. Computers or any programmable logic device can enable this programmable time delay. The MDET CL block takes an input trigger either from an internal generated source or from an external source (i.e. a computer command etc.) which can be selected under computer control and responds to that trigger by generating a trigger output for a radar transmitter signal generation device and a trigger output for a DETS sampling device.

The MDETS CL allows coarse time steps in the transmitter trigger and both coarse and fine delay steps in the receiver trigger so that the transmitter and receiver triggers can be offset with respect to one another by fine delays and the whole operational unit delayed by coarse steps. An output trigger is available from the MDETS CL and this can be enabled or disabled by computer control. In addition to the delayed triggers, the MDETS module can select transmitter signal generation and signal sampling triggering from external sources as well as the internal source. Since operation of all of these switches can be selected independently under computer or programmable logic control a very versatile building block is developed.

Figure 10:
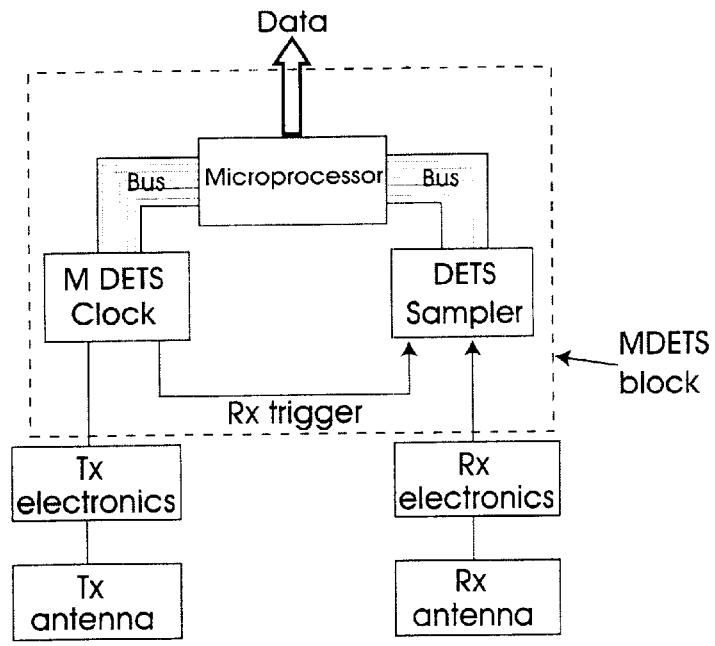
FIG. 10 is a schematic representation or using MDETS control logic in a single channel system including the transmitter receiver, and microprocessor.

FIG. 10 shows a complete single channel measurement system based on this MDETS logic.

The modular and compact nature of the timing and sampling control logic with MDETS allows chaining of units in many ways. To allow all of the possible forms of operation, MDETS CL modules are developed in two types denoted A and B, as shown in FIG. 11. The A type provides full versatility of input and output triggers and selection of operation with close ties to the signal generation circuitry (transmitter denoted Tx) and signal capture circuitry (receiver denoted Rx). The B type is a subset of A which has its main objective of acting as a control over an A-type unit, which acts as a slave to the B unit. The B-type is primarily required for managing time synchronous operation of A type units which are separated by substantial spatial distances. Type B devices do not have direct need for links to signal generation and capture.

The A type block diagram has four connections on the top, three on the bottom and two parts internally generated. The unit can be microprocessor controlled, has an embedded microprocessor as well as a communications bus to allow it to interact with all of the other units that would be put in any multi channel system. The B type diagram is similar but has only a subset of the type A ports.

The simple modular schematics shown in FIG. 11 are used to show how the interconnects for various operations can be managed. FIG. 12 shows the range of interconnects from the simple to the complex. FIG. 12a depicts the simple single channel system as previously depicted in FIG. 10. In other words, one MDETS A type CL unit will operate on its own and its only connection to the outside world need be that of exporting data or importing instructions as to what data it should collect.

Figure 12B:
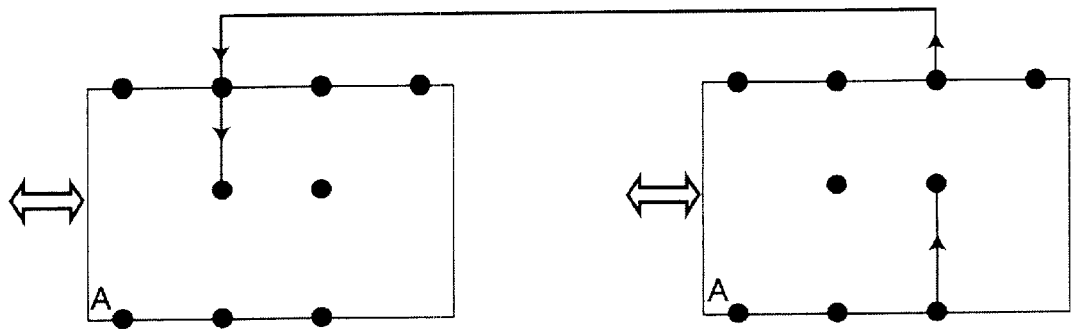

FIG. 12b illustrates use of a pair of type A MDETS modules where one module controls transmission and the other module controls signal capture. This is a very common requirement in GPR and the spatial separation between the units can be highly variable which the MDETS CL programmable capability can manage very effectively. In this case we are still really using a single transmit/receive configuration.

Figure 12C:
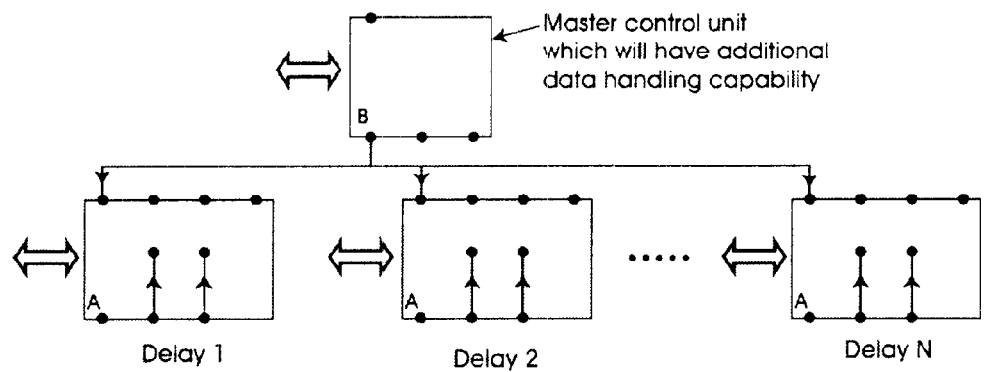

The next mode of operation is that of handling multiple channels of operation where time synchronization is not critical but interleaving operation can be important. FIG. 12c shows how an arbitrary number of units can be set up to operate in this fashion. One B-type MDETS unit is used as a master control. This unit provides a synchronizing trigger to all of the active units.

Each of the individual units acts on its own and acquires data when commanded by the synchronizing trigger from the B MDETS unit. All the A units then function independently internally. The factor which allows interleaving operations is that all of the units can be programmed to carry out their data point acquisition at an arbitrary delay after the common clocking trigger is received from the B unit. As a result each unit can acquire data in a small time slot independent of operation of the other units. Obviously the time window where overlapping can occur will depend on the exact configuration of the radar but this can be programmed in to any level of resolution needed.

When we speak about interleave timing in such systems, all units only have to have synchronized triggering to timing intervals on the order of microseconds for the applications presently envisioned. On the other hand if one requires synchronous time base acquisition within receivers then one may need timing resolutions to the order of tens to hundreds of pico seconds. Hence, we distinguish between interleaved operation and synchronous operation for timing requirements.

Figure 12D:
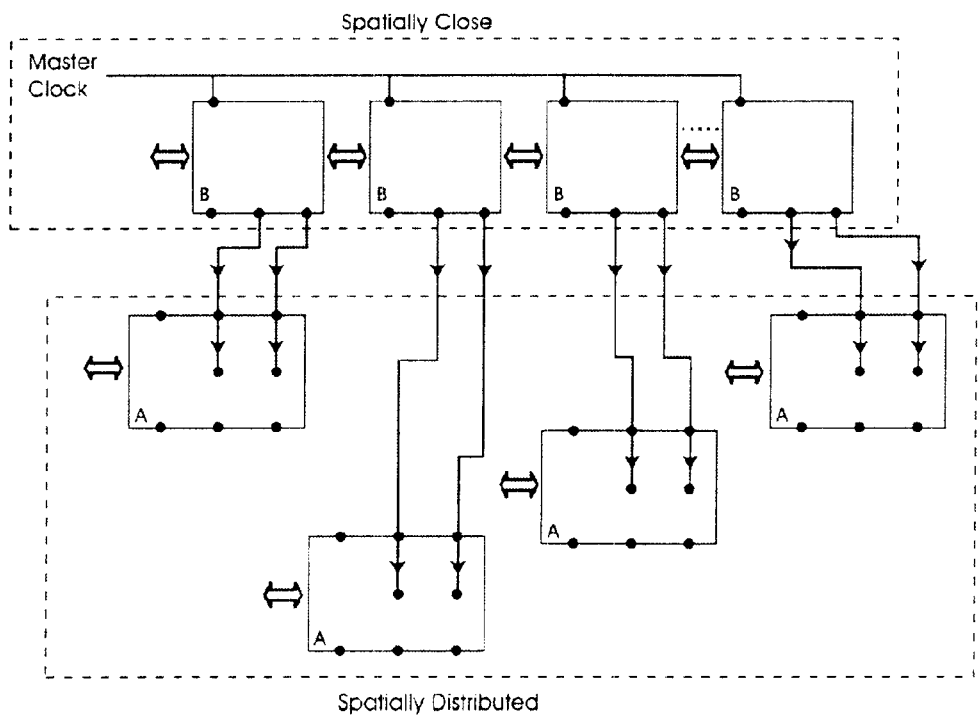

Fully synchronized time operation requires a B MDETS unit for every A MDETS unit deployed. The concept is depicted in FIG. 12d. The issue here is that the type A units are spatially distributed in an array with close proximity to the transmitting and receiving circuitry and the distances when translated to time delays by dividing by the speed of light between units can be quite large compared to the timing resolution needs of the application. As indicated previously, the travel time over interconnecting communications paths can be significant. As a result it is important to be able to compensate for all of these time delays associated with the spatial distribution so that all of the units can operate precisely in a synchronous fashion.

The manner in which this is achieved is to have a B MDETS unit for each A unit. The B units are all mounted in close spatial proximity in a single control unit with a master trigger to fire them all simultaneously. Each B unit can be programmed to have an offset time, which accommodates all of the time delays associated with connections to the individual A unit, which it controls. With appropriate control software a full system can determine individual path delays and adaptively compensate for these effects. This timing can be controlled down to the finest time resolution required for synchronous sampling for the particular application.

The key point is that the B units are spatially close to one another in a self contained module and the A units are spatially deployed over an arbitrarily large area. Note that all units are time programmable and operational programmable with non-volatile memory so that all of the necessary correction information can be learned and sustained and used within the system and interchanged digitally over the communications bus.

FIG. 13 describes a table outlining the various applications or desired targets that the present invention may be applied to.

Various embodiments of the invention have now been described in detail. Since changes in and/or additions to the above-described best mode may be made without departing from the nature, spirit or scope of the invention, the invention is not to be limited to said details.

We claim:

1. A mechanism for controlling and sequencing the creation and detection of signals, at precisely, controlled, programmable time intervals, with component distributed over an arbitrary spatial area and consisting of at least one emitting device and at least one detecting device for use near or on media to be imaged, comprising:

(a) a stable controllable oscillator providing a time base for all operations of said mechanism; and (b) a means for generating at least two output triggers, triggering at least one emitting device and at least one detecting device at said precisely controlled programmable time intervals, wherein said mechanism allows for the programmable offset of the operation of said mechanism.

2. Multiple mechanisms for controlling and sequencing the creation and detection of signals, at precisely, controlled, programmable time intervals, with components distributed over an arbitrary spatial location, of at least one emitting device and at least one detecting device for use near or on media to be imaged, comprising:

(a) at least one stable controllable oscillator providing a time base for all operations of said mechanisms; and (b) at least one means for generating at least two output triggers, triggering at least one emitting device and at least one detecting device at said precisely controlled programmable time intervals wherein said mechanisms allows for the programmable offset of the operation of each mechanism.

3. A mechanism or multiple mechanisms for controlling and sequencing the creation and detection of signals as claimed in claims 1 or 2 further comprising a computer or programmable device located internally or externally of said mechanism or said multiple mechanisms controlling the selection of said time intervals.

4. A mechanism or multiple mechanisms for controlling and sequencing the creation and detection of signals as claimed in claim 3 wherein said computer or programmable device located internally or externally of said mechanism or said multiple mechanisms controls the selection of the programmable offset.

5. A mechanism or multiple mechanisms for controlling and sequencing the creation and detection of signals as claimed in claim 3 wherein said computer or programmable device has data storage capacity of non-volatile information wherein said computer or programmable device retains programmable settings of said mechanism or said multiple mechanisms for an indefinite period of time.

6. A mechanism or multiple mechanisms for controlling and sequencing the creation and detection of signals as claimed in claim 4 further comprising a communication means for communication of said programmable settings between said mechanism or said multiple mechanisms and internally or externally between said computer or programmable device.

7. A mechanism or multiple mechanisms for controlling and sequencing the creation and detection of signals as claimed in claims 1 or 2 further comprising a program or logic device for adaptively adjusting said setting of said mechanism or said multiple mechanisms allowing for the operation of said mechanism or said multiple mechanisms to adjust for changing environment.

8. A mechanism or multiple mechanisms for controlling and sequencing the creation and detection of signals as claimed in claims 1 or 2 wherein said mechanism or said multiple mechanisms receive information regarding their spatial location for use in self reprogramming to changes in said spatial location where said changes are inputted manually, electrically or through an electronic positioning device.

9. A mechanism or multiple mechanisms for controlling and sequencing the creation and detection of signals as claimed in claim 7 wherein said logic device or program and said mechanism or said multiple mechanisms function together as an equivalent time sampling subsurface image device.

10. A mechanism or multiple mechanisms for controlling and sequencing the creation and detection of signals as claimed in claim 9 wherein said logic device or program allows said mechanism or said multiple mechanisms to initiate a sequential frequency capture of a transfer function using heterodyning or signal mixing measurement procedures for producing a subsurface imaging device.

11. A mechanism or multiple mechanisms for controlling and sequencing the creation and detection of signals as claimed in claim 9 for a bistatic subsurface imaging device with arbitrary spatial separation between paid emitting device and said detecting device.

12. A mechanism or multiple mechanisms for controlling and sequencing the creation and detection of signals as claimed in claim 9 further comprising a plurality of subsurface imaging devices operated in time synchronous or programmable staggered synchronous fashion to achieve enhanced subsurface imaging without said subsurface imagining devices interfering with each others operation.

13. A mechanism or multiple mechanisms for controlling and sequencing the creation and detection of signals as claimed in claim 9 further comprising a plurality of subsurface imaging devices distributed over an arbitrary spatial area wherein said emitting devices and said detecting devices are operated in synchronous fashion or time staggered fashion to achieve enhanced subsurface imaging by means of additive or constructive interference signal methods of increasing signal strength.

14. A mechanism or multiple mechanisms for controlling and sequencing the creation and detection of signals as claimed in claim 12 wherein said subsurface imaging devices allows for imaging a larger volume of the subsurface concurrently.

15. A mechanism or multiple mechanisms for controlling and sequencing the creation and detection of signals as claimed in claim 9 wherein said subsurface imaging device is a ground penetrating radar for applications selected from the group consisting of agriculture, airports, archeology, biocounting, bridges, building inspection, concrete, conveyor belts, dams, environmental, forensics, police matters, geotechnical, gravelpits, graveyards, groundwater, hydro power, nuclear power, ice detection, snow detection, lakes, rivers, military, mining, pipe inspection, sewer inspection, quarries, milroads, real estate roads, security, immigration, customs, smelters, treasure mapping, trenchiess technology, tunnelling, utility works, pipes and wood inspection.

16. A mechanism or multiple mechanisms for controlling and sequencing the creation and detection of signals as claimed in claims 6 wherein said signals are randomized or positioned in time to spread emission spectra as uniformly as possible or to remove emission from a selected portion of the frequency spectrum of said subsurface imaging devices.

17. A mechanism or multiple mechanisms for controlling and sequencing the creation and detection of signals as claimed in claim 5 further comprising a communication means for communication of said programmable settings between said mechanism or said multiple mechanisms and internally or externally between said computer or programmable device.

18. A mechanism or multiple mechanisms for controlling and sequencing the creation and detection of signals as claimed in claim 10 for a bistatic subsurface imaging device with arbitrary spatial separation between said emitting device and said detecting device.

19. A mechanism or multiple mechanisms for controlling and sequencing the creation and detection of signals as claimed in claim 10 further comprising a plurality of subsurface imaging devices operated in time synchronous or programmable staggered synchronous fashion to achieve enhanced subsurface imaging without said subsurface imagining devices interfering with each others operation.

20. A mechanism or multiple mechanisms for controlling and sequencing the creation and detection of signals as claimed in claim 10 further comprising a plurality of subsurface imaging devices distributed over an arbitrary spatial area wherein said emitting devices and said detecting devices are operated in synchronous fashion or time staggered fashion to achieve enhanced subsurface imaging by means of additive or constructive interference signal methods of increasing signal strength.

21. A mechanism or multiple mechanisms for controlling and sequencing the creation and detection of signals as claimed in claim 13 wherein said subsurface imaging devices allows for imaging a larger volume of the subsurface concurrently.

22. A mechanism or multiple mechanisms for controlling and sequencing the creation and detection of signals as claimed in claim 10 wherein said subsurface imaging device is a ground penetrating radar for applications selected from the group consisting of agriculture, airports, archeology, biocounting, bridges, building inspection, concrete, conveyor belts, dams, environmental, forensics, police matters, geotechnical, gravelpits, graveyards, groundwater, hydro power, nuclear power, ice detection, snow detection, lakes, rivers, military, mining, pipe inspection, sewer inspection, quarries, milroads, real estate roads, security, immigration, customs, smelters, treasure mapping, trenchless technology, tunnelling, utility works, pipes and wood inspection.

23. A mechanism or multiple mechanisms for controlling and sequencing the creation and detection of signals as claimed in claim 8 wherein said signals are randomized or positioned in time to spread emission spectra as uniformly as possible or to remove emission from a selected portion of the frequency spectrum of said subsurface imaging devices.

24. A mechanism or multiple mechanisms for controlling and sequencing the creation and detection of signals as claimed in claim 9 wherein said signals are randomized or positioned in time to spread emission spectra as uniformly as possible or to remove emission from a selected portion of the frequency spectrum of said subsurface imaging devices.

* * * * *